United States Patent [19]

Spiro

[11] Patent Number: 4,638,298
[45] Date of Patent: Jan. 20, 1987

[54] COMMUNICATION SYSTEM HAVING MESSAGE REPEATING TERMINALS

[75] Inventor: Jan L. Spiro, Santa Clara, Calif.

[73] Assignee: Telautograph Corporation, Los Angeles, Calif.

[21] Appl. No.: 756,097

[22] Filed: Jul. 16, 1985

[51] Int. Cl.⁴ .............................................. H04M 11/04
[52] U.S. Cl. .................. 340/827; 340/825.52; 340/310 A; 340/425; 179/18 EA
[58] Field of Search ............ 340/310 A, 310 R, 825.5, 340/825.51, 825.05, 825.52; 370/89, 85, 94; 179/18 EA

[56] References Cited

U.S. PATENT DOCUMENTS

| | | | |
|---|---|---|---|
| 3,693,155 | 9/1972 | Crafton et al. | 340/310 R |
| 3,911,415 | 10/1975 | Whyte | 340/310 A |
| 3,942,168 | 3/1976 | Whyte | 340/310 R |
| 3,944,723 | 3/1976 | Fong | 178/825.02 |
| 3,967,264 | 6/1976 | Whyte et al. | 340/310 A |
| 3,973,087 | 8/1976 | Fong | 179/310 R |
| 3,973,240 | 8/1976 | Fong | 340/310 A |
| 4,210,901 | 7/1980 | Whyte et al. | 340/310 R |
| 4,250,489 | 2/1981 | Dudash et al. | 340/310 A |
| 4,427,968 | 1/1984 | York | 340/310 R |
| 4,432,088 | 2/1984 | Frankel | 340/825.5 |
| 4,434,463 | 2/1984 | Quwquis et al. | 370/85 |
| 4,510,599 | 4/1985 | Ulug | 370/85 |
| 4,551,721 | 11/1985 | Kozlik | 340/825.05 |

Primary Examiner—John W. Caldwell, Sr.
Assistant Examiner—David A. Okonsky
Attorney, Agent, or Firm—Cushman, Darby & Cushman

[57] ABSTRACT

A system is provided for communicating between terminal units joined on a power distribution network. The terminal units in the system are capable of interfacing with external devices to which they are attached, of communicating with other terminal units, and of functioning as repeater units. When a message is received by a terminal unit, it determines whether the message is intended for itself or for another terminal unit. If it is intended for another terminal unit, it amplifies and retransmits the message. The system also includes means for determining the shortest communication path between one unit and an intended recipient terminal unit. When a previously established communication route is no longer effective, the system automatically determines a new communication route.

37 Claims, 5 Drawing Figures

COMMUNICATION SYSTEM HAVING MESSAGE REPEATING TERMINALS

BACKGROUND OF THE INVENTION

This invention pertains to network communication systems, and more particularly, to such a system having a terminal unit with message repeating capabilities.

The piggy-backing of a communication system over an electrically conductive network used for other purposes have had much developmental work. Communication over one such network, a power distribution network, offers particular advantages to electric utilities because it provides communication to those points where the electrical power is distributed without installing a separate communication medium.

These systems have been used for a variety of purposes, including office communications, load control, alarm systems, and meter reading. However, the power distribution network provides a uniquely hostile environment for communications. Interfering phenomenon include spikes typically of several volts and amplitude with frequency content into the megahertz region, occurring several times per power line cycle; high signal attenuation due to large RF loads, particularly capacitors embedded in other equipment; dynamically variable signal attenuation due to changing loads; highly non-uniform transmission as a function of frequency; other continuous wave signals; and lack of coupling between windings of distribution transformers.

Almost all network communication systems which have been developed are directed over a pyramid network, typically from a substation to individual power delivery terminal units on a secondary feeder line. Communication takes place between the central control unit and the remote terminals. In these systems it is typical to put repeaters at transformer locations in order to overcome the typical high attenuation at such points. Further, additional repeaters are often used for long primary or secondary distribution lines. Specifically, attention has been given to avoiding oscillation, addressing repeaters, and routing messages. In all cases, the repeater has been a separate, stand-alone device uniquely dedicated to serving as a repeater. Furthermore, effort is required to determine the proper location of a repeater which typically is designed for a particular network. When that network changes, repeater locations also have to be changed.

Typical efforts which have been made in this area are described in the following U.S. patents: U.S. Pat. No. 3,693,155 issued to Crafton et al.; U.S. Pat. No. 3,911,415 issued to Whyte; U.S. Pat. No. 3,942,168 issued to Whyte; U.S. Pat. No. 3,944,723 issued to Fong; U.S. Pat. No. 3,967,264 issued to Whyte et al.; U.S. Pat No. 3,973,087 issued to Fong; U.S. Pat. No. 3,973,240 issued to Fong; U.S. Pat. No. 4,210,901 issued to Whyte et al.; U.S. Pat. No.4,250,489 issued to Dudash et al.; and U.S. Pat. No. 4,427,968 issued to York. The last patent in this list, as an example of a pyramid network system, discloses the use of repeaters which can be used to relay messages to terminal units. If the distribution network changes the repeaters can be downloaded with route information to accommodate different message routes.

Heretofore, there has thus been a need to install repeaters along a network where a central unit and a terminal unit are not in direct communication. In an environment which has a large number of terminal units there may thus be a substantial redundancy of equipment required. For example, a power distribution system used to monitor or read meters at power delivery points would have a large number of terminal units communicating with a remote central unit. Further, in an office environment where there is communication between individual terminal units, there are typically a large number of terminal units communicating over a single distribution network. Usually in such an environment, each terminal unit is able to communicate with at least one other terminal unit but not necessarily with all other terminal units. An elaborate design process is required in such instances to determine where repeater units need to be located and how they need to interface in order to provide communication between all of the terminal units. When changes take place on the network, a reanalysis of the network is necessary in order to determine where changes in repeater unit locations are required. Further, in a system in which message traffic is limited to travel between individual terminal units and a central unit, there has been little need to accommodate more than a very few message routes for each repeater. In an office communication system this is inadequate because of the multitude of possible message routes which exist.

SUMMARY OF THE INVENTION

The present invention provides a terminal unit which also functions as a repeater unit. It is usable in a communication system having a plurality of units which communicate over a communication medium such as a power distribution network. A terminal unit is a unit which also communicates with an external communication device such as a printer, keyboard, display, computer, telephone modem, meter or other input/output (I/O) device. Data or control information is transmitted to an output device or received from an input device. A repeater unit, or unit which performs a repeating function, is any unit which simply serves to receive, amplify and retransmit a signal appearing on the communication network.

For purposes of this discussion, the data and/or control information which is transmitted between units and between a unit and an external device is referred to as a message. It will be seen that a message can have various contents as it travels from an input device into a terminal unit, through various units in the communication system to one or more designated terminal units, and to associated output devices. So long as a message contains some basic information as it progresses through the system, it is referred to as a single message, even though portions of its content may vary.

A communication system provided by the present invention having terminal units which are spaced closely enough to provide direct communication between any unit and at least one other unit obviates the need for selection and placement of repeater units. As discussed earlier, this type of system can be used for power meter reading, office communication on a network, and other such applications. In addition to having the usual terminal unit capabilities, such as means for receiving messages from an input device and generating those messages to another terminal unit and/or means for receiving messages from another terminal unit and for transmitting them to an output device, each terminal unit also has means for determining whether a message received from another terminal unit is intended for yet a third terminal unit and means for retransmitting on the network such a message intended for the third unit.

A communication protocol is used which enables all units to communicate. Each terminal unit is provided with a list of addresses of units forming a communication route to at least one receiving unit and means for generating a message with the sequence listing of units forming the communication route. In particular, if communication between two units requires the use of one or more repeater units, the communication route is encoded into the message. Furthermore, any response by the receiving unit is returned using the original route in reverse.

In the preferred embodiment of this invention, a host unit controls the order of operation of the other units. That is, if communication directly between two units is not available, the message is relayed through the host unit and then out to the intended recipient terminal unit via other terminal units functioning as repeater units as required. The host unit determines the communication routes necessary to communicate with each of the terminal units. The routes are established by a method which determines the shortest possible route in the system. Communication routes are also automatically changed in order to accommodate varying conditions in the system or on the network.

In such a system it can be seen that the costs related to the manufacture and installation of dedicated repeaters are eliminated. The additional cost of providing repeater capability within a terminal unit is small, since each terminal unit is already required to have a communications transceiver, microcomputer, power supply and packaging. The only additional cost is that required to provide the more complex microcomputer program.

These and other features and advantages of the invention will be more clearly understood from a consideration of the drawings and the following detailed description of the preferred embodiment.

BRIEF DESCRIPTION OF THE DRAWINGS

With reference to the accompanying four sheets of drawings.

DETAILED DESCRIPTION OF A PREFERRED EMBODIMENT

Figure 1:
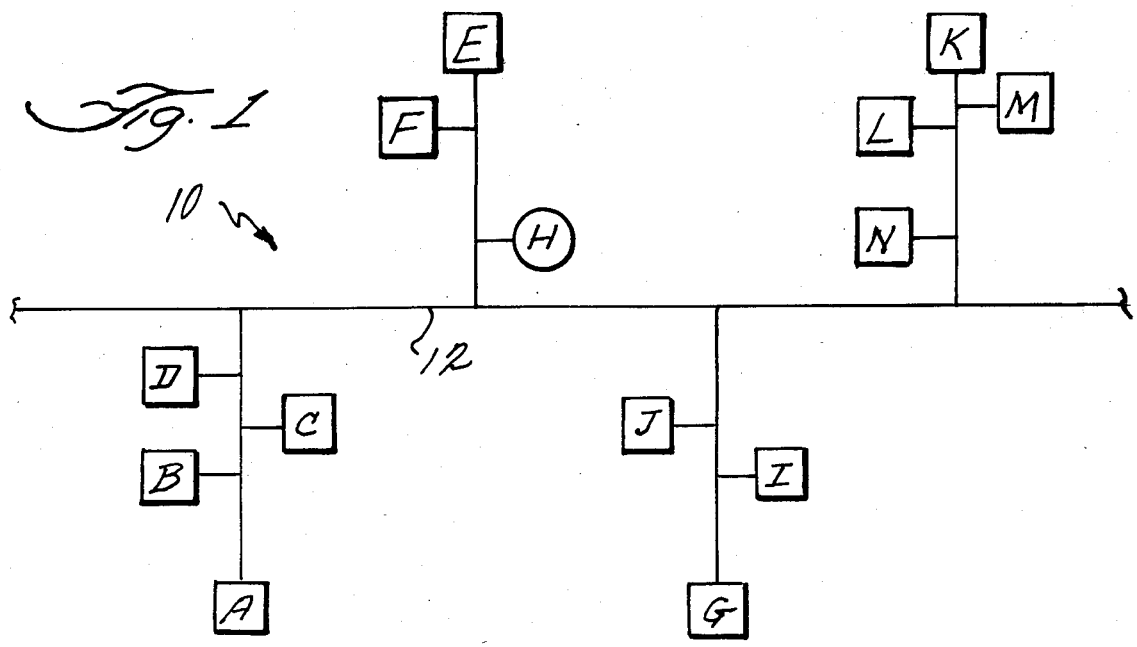
FIG. 1 is a block schematic of a representative communication system as contemplated by the present invention with an associated communication network.

With reference initially to FIG. 1, a communication system, shown generally at 10 is joined to a power distribution network 12 such as may exist in a typical business office environment or the like. In the example illustrated, there are four branches of the network 60 joined to a common power line. A host unit, shown by the letter H in a circle, serves as a control unit for thirteen terminal units represented by the box-shaped figures having letters ranging from A to M. Each of the terminal units in this embodiment is connected to various external communication devices, commonly referred to as I/O devices, such as defined earlier, including a keyboard, visual display, and printer. Each terminal unit is typically placed on or near a desk in an office. As an example, if a person associated with terminal unit A desires to communicate with the person associated with terminal unit K, she or he simply enters an identification code for that unit, such as the initials of the person associated with it, and then enters a message to be received by that person. The microcomputer converts the code to the address for unit K and transmits the message.

The following discussion describes how communication is provided between any two such units by using intermediate terminal units as repeater units, where necessary, in order to assure transmission of a message to a desired recipient terminal unit.

An attempt is initially made by a sending terminal unit to communicate directly with a desired recipient terminal unit. If this is not successful the message is sent to the host unit which then relays the message to the intended recipient unit through intermediate relay units, if necessary. This has been found to be a relatively simple and inexpensive system to produce and operate.

In situations where the size of the network and number of units causes the system to be more complex, each individual terminal unit may be provided with the route finding capabilities provided by the host in the system described here. This permits each individual terminal unit to find the shortest communication route to any other terminal unit, without necessarily relaying it through the host unit.

Figure 2:
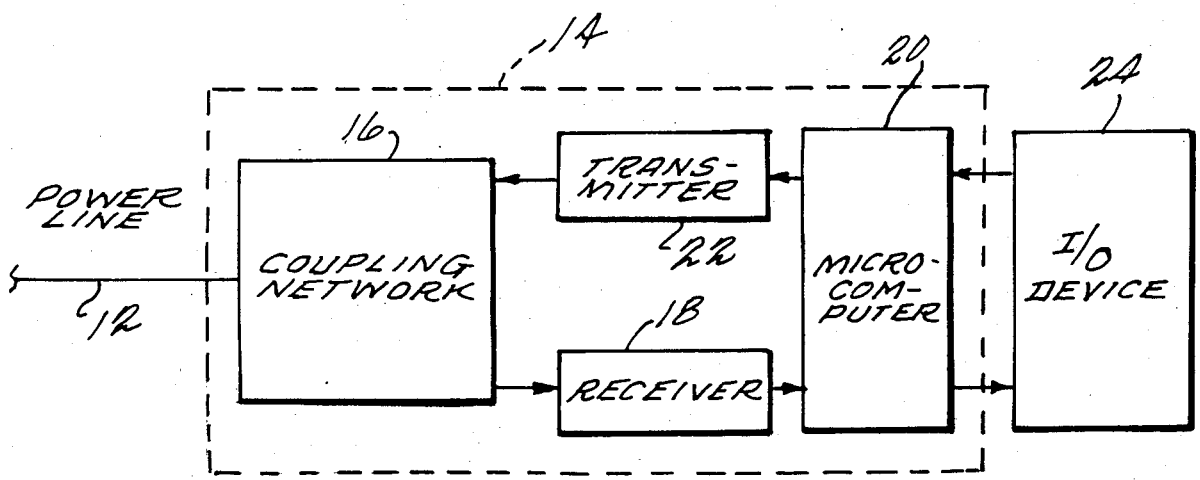
FIG. 2 is a general block diagram showing the major functional components of a terminal assembly including a terminal unit and an I/O device.

Referring now to FIG. 2, the main operating blocks of a terminal assembly of communication system 10 are shown. A power line forming part of network 12 is joined to a terminal unit 14 (representative of one of the terminal units in FIG. 1), shown in dashed lines, and in particular, to a coupling network 16. Signals received on network 12 are transmitted through coupling network 16 to a receiving unit 18 which conveys the signal to a microcomputer 20. The microcomputer then processes the signal and, if unit 14 is functioning as a repeater unit for the received message, retransmits the signal through a transmitter 22 and coupling network 16 back to network 12. If it is a message intended for terminal unit 14, the message data received by the microcomputer is transmitted to an output device 24. In this case, device 24 would typically be a printer or visual display. Terminal unit 14 may also receive data from an input device 24, such as a keyboard, for transmission to another terminal unit. Host unit H of FIG. 1 has the same general components as terminal unit 14 but typically without the interfaces to I/O units, although it could also be connected to I/O units like those described.

On each side of the coupling network the signal is in the form of a modulated carrier, whereas at the microcomputer the signal is at base band digital levels. The function of the transmitter is therefore to modulate and amplify the carrier, whereas the function of the receiver is to demodulate the carrier and output correct digital levels. Coupling network 16 serves to keep power line frequencies and destructive surges out of the transmit and receive circuitry. Microcomputer 20 includes a commercially available microprocessor PROM and RAM, and serves to interpret and respond to the base band signal presented by the receiver or I/O device thereby providing the various means to be described for operating the system. The detailed hardware implementation of these blocks is not the subject of this invention as it is generally known to practitioners familiar with the art.

The primary function of communication system 10 is to transport data between terminal units. The use of the data transported is immaterial to the system operation. Upon reaching its destination the data is used as appropriate to control an I/O device. In support of this primary function, various secondary functions are used. Means are provided for limiting the transmission of messages to one unit at a time. Specifically, what may be referred to as a "token" passing protocol is used wherein a unit with an imaginary token has control of the communications. That is, it is the only unit which will issue commands over the power line. A relay command also exists in order to provide for operation of terminal units as repeaters during relaying of a message. Each unit is assigned a unique identifier, referred to as a serial number, preferably having six decimal digits which are entered into memory during production and retained thereafter. Further, error correcting and detecting codes are used. These codes are well-known to persons skilled in the art and also are not the subject of this patent.

To aid in understanding the operation of communication system 10, several terms, and command codes are first explained. These explanations are then followed by a more general discussion of system operation with reference to FIGS. 3-5. However, these figures may be reviewed now to provide a framework on which to base the following explanations.

The system uses the following standard ASCII control bytes: SOH,EOT,STX,FF,ACK,NAK,BS, ETX,ETB,SO,ENQ,BEL,FS,US,EM. Each unit in the system, in addition to the serial number, has an identifier or ID which consists of ten bits. A unit sending a message is considered to have a sender's ID or, for short, SID. A typical message includes a command that requires a receiving unit to perform some action. This command is a character string forming a code which is generated by a sending unit. A response is a character string which responds to a received command and is sent by a receiving unit to a sending unit. These are discussed in detail in the following discussion.

MESSAGE FORMAT

Any message sent via a unit has the following structure: SOH-(MESSAGE BODY)-EOT. The message body may include a command block and/or a data block. A command block consists of a command or response followed by "SID". If both a command block and data block are present they are separated by a comma. SID is present for all commands and responses except during transfer of control. STX in the data block indicates that the remainder of the message up to ETB is for an I/O device.

COMMANDS/RESPONSES

A discussion of the various commands which are used in system 10 and the corresponding responses which may be given on receipt of a message containing those commands follows. In general the first byte of a command body is a unique control character other than SOH or EOT. The first byte of a response may be a control character or a serial number depending on the command, as defined below. Due to the noisy environment existing on a power line, it may be necessary to repeat a message several times before it is completely, properly received. Thus, response is repeated each time a command is received.

In general, one of three responses is issued on receipt of a message containing a command. First, ACK may be issued to indicate that a message was understood and that there were no errors. Correspondingly, a response of NAK indicates that a message did contain errors and must be retransmitted. A complete lack of any response indicates that the command block contains errors. Unless otherwise indicated, ACK and NAK are followed with the sender's identifier (SID) which was received in the command to which a response is being transmitted.

TRANSFER OF CONTROL

In order for a unit to be able to transmit a message it is necessary that the unit obtain the imaginary "token". Only one token exists in the system. Means are provided for first inquiring whether a unit has a message to send. This is accomplished by the host issuing a Token Offer command, SO, broadcasted generally to the terminal units.

It can be seen that since the Token Offer command is non-specific as to which terminal unit is being queried, there may be times when multiple terminal units respond to the command. There is a delay procedure used which overcomes this problem. If a unit asserts the token but is not granted it, it waits for the Nth instance of Token Offer before trying again, where N is based on the number of times K, the token has already been tried for. If K equals 1-3, then N is equal to the K least significant bits of the unit's serial number. If K equals 4-6, then N is formed from the three least significant bits of the least significant digit of the serial number plus 8 times a number formed from the K least significant bits of the next least significant digit. If K equals 7, then N equals 1. The resultant delay provides a generally random delay time.

Means are also provided in each terminal unit for transmitting a response to an inquiry regarding whether it has a message to send. Specifically, when a terminal unit receives a Token Offer it responds by transmitting back to the host unit its serial number when it has a message to send. Means are provided for transmitting to the terminal unit a message authorizing it to transmit the message it has. This is accomplished by the host which issues a Grant Token command in the following form: SUB,serial number,ID0,ID1 . . . ,IDn. This command grants the token to the unit with the indicated serial number and, if this is the first communication that the host unit is making with the terminal unit, ID0 is an identifier assigned to the terminal unit. If prior communications have been established with this unit, ID0 is the same identifier previously assigned to it. Receipt of this command informs the terminal unit of the sequential list of addresses ID1, . . . ,IDn forming the route which is required to communicate with the host unit. Each terminal unit includes means for storing this communication. If the host unit can communicate directly with the terminal unit, then there is no communication route.

On receipt of a Grant Token command, a terminal unit responds with "ACK,ID0". It then waits for a delay period to allow the unit sending the Grant Token command to repeat the command if it does not receive the response. If the command is not repeated, then the terminal unit having the token commences activity.

In order to complete the control cycle, means are provided in each terminal for transmitting a message releasing its authority to transmit. More specifically, after the terminal unit receiving the token has transmitted its message directly to a terminal unit, or failing to do so, needs to transmit it through the host unit, the token is returned to the host unit. In such a case the token offer command is sent with serial number "0000" and no other identifier except for the communication route to relay the message to the host unit, as will be discussed shortly. This returns the token to the host unit.

For individual inquiry regarding the availability of messages for transmission, a Poll command is issued by the host unit. This command consists of "ENQ,ID". The unit identified may make a general response by transmitting "ACK,ID" which states that a message is to be sent. Preferably, the Token Offer and Poll commands are issued alternately.

It is also possible to build a priority system into the protocol so that certain types of messages are given a higher priority, that is, are transmitted earlier than messages with a lower priority. In such a case, the response to the Token Offer or Poll commands could be coded to indicate the type of message to be transmitted. The token is then assigned to units based on the priority of messages to be sent.

Open Data Link

When a terminal unit receives the token, it has authority to transmit a message. Since it is the only terminal unit to have authority to transmit a message, it will be the only one using the power line for communication at that time. However, before sending the actual message, due to the harsh environment of a power line, means are provided for establishing the capability of communicating with the desired recipient before the message is actually sent. This is provided in part by means in the sending terminal unit for inquring whether the intended recipient unit is ready to receive a message. This assures that the recipient unit is available for receiving a message. A command referred to as an Open Data Link command is used by the terminal unit (or the host unit when it is communicating with a terminal unit). This command has the following format: "FF,SID,IDr,t". Where IDr is the identifier of the recipient unit and t represents the type of I/O device receiving the data. Representative values of t could thus be P, for a printer or D for a display monitor. In the preferred embodiment t can also have the value of T when the time and date are being transmitted by a host unit to the terminal unit. In this way, the time can be continuously displayed on a monitor when it is not otherwise being used. It can be seen that the Open Data Link command can be adapted to different types of I/O devices simply by assigning appropriate values to the parameter t.

Means are provided in each unit for transmitting an appropriate response to a unit inquiring whether it is ready to receive a message. If the intended recipient unit is ready to receive a message it responds with "ACK,SID". If the output device of the recipient unit is busy, the unit responds with "BS,SID". In such a case, as will be discussed later, the terminal unit then forwards the response via the host unit.

As has been mentioned, it is assumed that a terminal unit will either be able to directly communicate with another terminal unit or will send a message to it relayed through the host unit. Thus, a message sent directly to a recipient unit will have the form "STX(DATA)ETB". Depending on whether the message was received without errors, the recipient unit will respond with ACK, NAK or no response, as was discussed previously with respect to responses in general.

Relay

If the sending terminal unit is unable to communicate directly with intended recipient unit, it relays the message through the host unit with the following message:

"FS,SID,t,ID1 . . . ,IDn,STX(DATA)ETB"

where ID1–IDn are intended recipients, and t is the intended I/O device. The usual responses are then returned by the host unit. This message assumes there is direct communication between the terminal and host units. If not, means are provided for generating the message with the sequential list of addresses of units forming the communication route. This will be explained further with respect to the retransmission operation of the host unit.

Assuming effective transfer (including return of the token), the host unit transmits the message to each intended recipient. When the host forwards the message to an intended recipient terminal unit the following message format is used:

"US,SID0,ID1 . . . ,IDn,US,US,(ANY MESSAGE)".

Note that (ANY MESSAGE) represents the command block and/or data block message format discussed previously. US is the ASCII character for a unit separator. IDK and SIDK are the identifier or sender's identifier, respectively, of the KTH unit. ID1 . . . ,IDn is a sequential listing of repeating terminal units forming the communication route. The unit whose ID follows SID is the next intended unit in the communication route to which the message is being addressed.

If this unit receives the command correctly it issues "ACK,SID0", and reissues a modified command. Means are provided in each terminal unit for modifying the sequential listing of identifiers or addresses in a form identifying the next intended recipient unit. Means are also provided in each repeating terminal unit for listing in a retransmitted message its identifier with a sequential listing of addresses of units which previously retransmitted the message. The reissued command from unit ID1 thus has the following form:

"US,SID1,ID2 . . . ,IDn,US,ID0,US,(ANY MESSAGE)".

It can be seen that the relaying unit lists itself as the sender unit and places the previous sender unit in a new field showing a sequential list of the identifiers of the units which previously have transmitted the message. The next intended recipient is shown as ID2. It can be seen that by the time the message is transmitted by the last repeating terminal unit, IDn, it will transmit a message having its identifier as the sender identifier, no intended recipient unit numbers, and the entire sequential list of preceding relay units.

Since the intended recipient terminal unit has already been queried by an Open Data Link command to confirm that it is ready to receive a message, it is open to any messages received. The last relay unit therefore simply broadcasts the relayed message. The intended recipient unit is the only terminal unit which will respond to the broadcasted message. Therefore, it is not necessary to specifically identify the intended recipient unit at the final relay point.

If the message has errors, the receiving unit issues a response as discussed previously. The last sending unit then retransmits the data. As is well-known in the industry, the message can be divided into blocks which start at the end of one checksum and include the message portion up to and including the next checksum. With such a system, the receiving unit can identify which blocks of the message were not received error free, and the transmitting unit can then retransmit only those blocks.

If at any point during the relay of the message there is a failure to communicate with the next unit in the relay path, the unit attempting to send returns "EM,ID" (where ID is its own ID) back to the original sending terminal unit. As long as there is a response of "ACK" at each relay leg of the message transmission, the message will be transmitted to the intended recipient terminal unit.

The response of the recipient unit is retransmitted to the original sending unit. Initially, the actual recipient unit simply transmits its response. The relay unit which broadcasted the message then concatenates this response with a sequential list of relay terminal units forming the return communication route which is the reverse order of the transmitted relay units. The format of the initial response message is therefore:

"DEL,SIDn,IDn−1, . . . ,ID0,US,(RESPONSE)"

Each relay unit in turn simply removes the identifier of the previous (sending) unit from the relay path list and retransmits the message. Its own identifier becomes the new SID. When the original sending unit ID0 receives this command from the prior unit, ID1, it looks after the US for the (RESPONSE). The response command is implemented in this way, instead of having unit ID1 simply issue or broadcast "RESPONSE", to ensure that the response is received by the original sending unit. That is, since the relay command is transmitted to it, it must respond to unit ID1 with an "ACK" if it receives the response, or other appropriate response if it did not. Note also that a response of NAK by the recipient unit will result in a retransmission by the last sending unit.

System Operation

Figure 3:
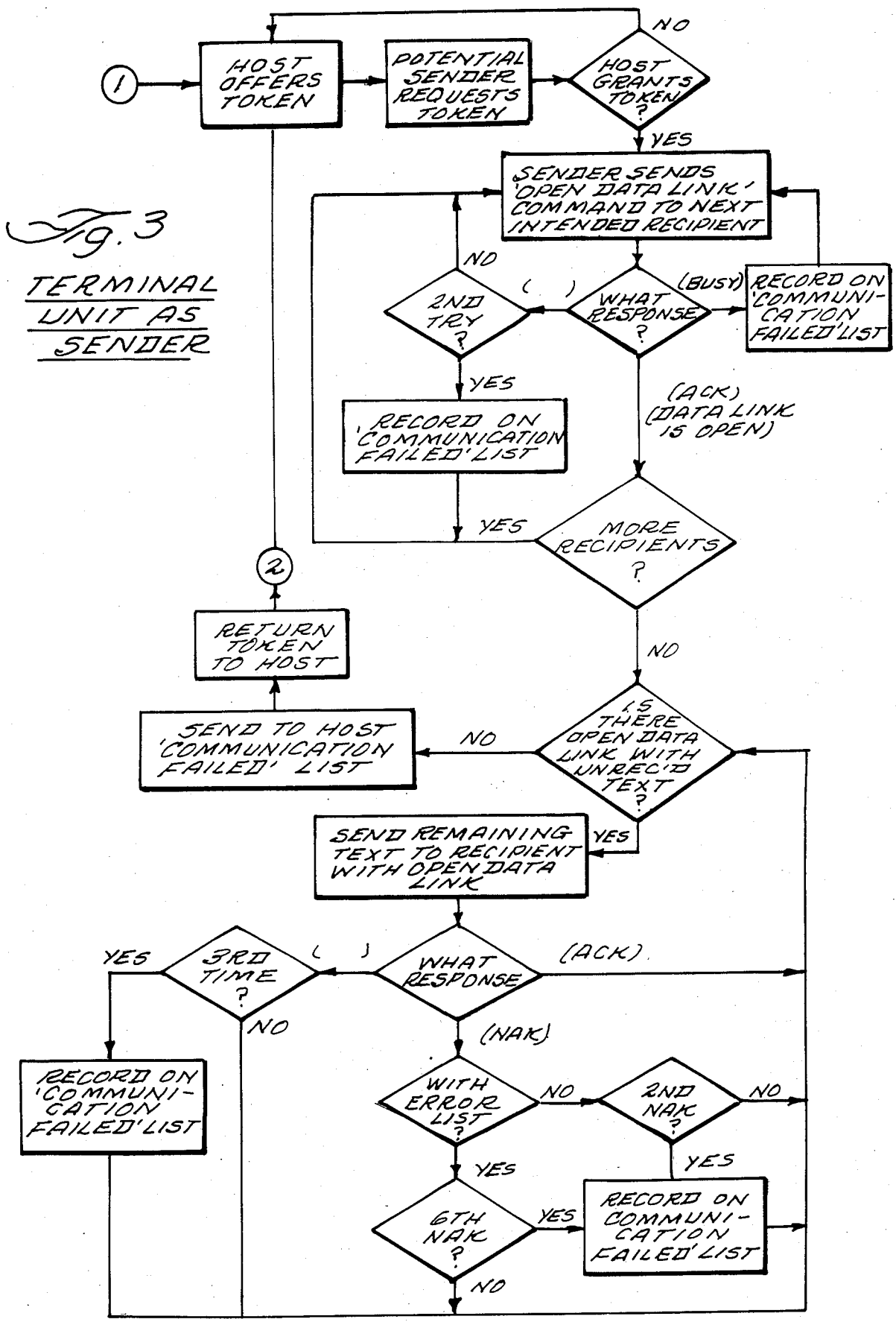
FIG. 3 is a flowchart showing a sequence of steps for operation of a terminal unit as a message sender.

Having an understanding, now, of the various system commands and of how specific phases of the operation work in detail, the system operation now will be described generally, with the understanding that the preceding discussion of commands will apply, as appropriate. Referring initially to FIG. 3, a flowchart showing operation of a terminal unit as a sender is shown. Beginning with starting point identified at 1, the host unit offers the token by issuing Token Offer and Poll commands. Both of these commands are issued with the aid of the Relay command, as needed, to ensure coverage of all units in the system. A potential sender then requests the token by returning a positive response (its serial number) to the host unit. The host unit issues the Grant Token command. If a terminal unit responds positively to a Token Offer command or Poll command but is not offered the token, it delays further responses to subsequent issues of the command according to the exponential backoff algorithm described previously. This keeps contending terminal units from continuously garbling each other's responses to the Token Offer. As added insurance, the Poll command guarantees a lack of contention.

When a terminal unit receives the Grant Token command, it first updates its memory with the relay path to the host unit transferred with the command. As will become evident from further discussion with respect to the particular means for determining a relay path initially, it will be understood that, given the ability of the host unit, in this preferred embodiment, of determining a relay path, the host unit can, using the Poll command, attempt to offer the token to each unit which has previously been identified. If a previously existing relay path does not provide communication to the desired polled unit, the host unit will proceed through the relay path determining procedure in order to re-establish communication with that particular unit. In this way, it will be seen that the system automatically accommodates any changes that take place in the communication network or arrangement of terminal units so that communication is always established where possible to do so. Further, by using the Token Offer command it is possible to identify any new terminal units which have been placed on the line so that communication paths may be established directly to them.

After a sending unit receives the Grant Token command and updates its memory with the relay path to the host unit, it then attempts to initiate communication with the intended recipient terminal unit using the Open Data Link command. If it gets a positive response, it attempts to send the data.

As shown in FIG. 3, if no response is received by the sender unit after two tries or if the intended recipient unit is busy, the intended recipient identifier is recorded on a "Communication Failed" list. In this way, an open data link is established with all available intended recipients. For each recipient with an open data link established, the text is sent to it. If a positive response is received, the data is transmitted to the next recipient. If three attempts are made at sending the message with no response being received, the intended recipient is listed on the "Communication Failed" list. If a NAK is received with an error list six times or without an error list twice, it is also recorded on the "Communication Failed" list. After attempts have been made to send messages to all intended recipients, the "Communication Failed" list is sent to the host along with the token and the message/text so that the host can then relay the message to those units.

Once a recipient unit has its data link opened, it regards its data link as open until it receives the data error free. At this point it regards its data link as closed, and issues ACK in response to ETB, the end of data.

Figure 4:
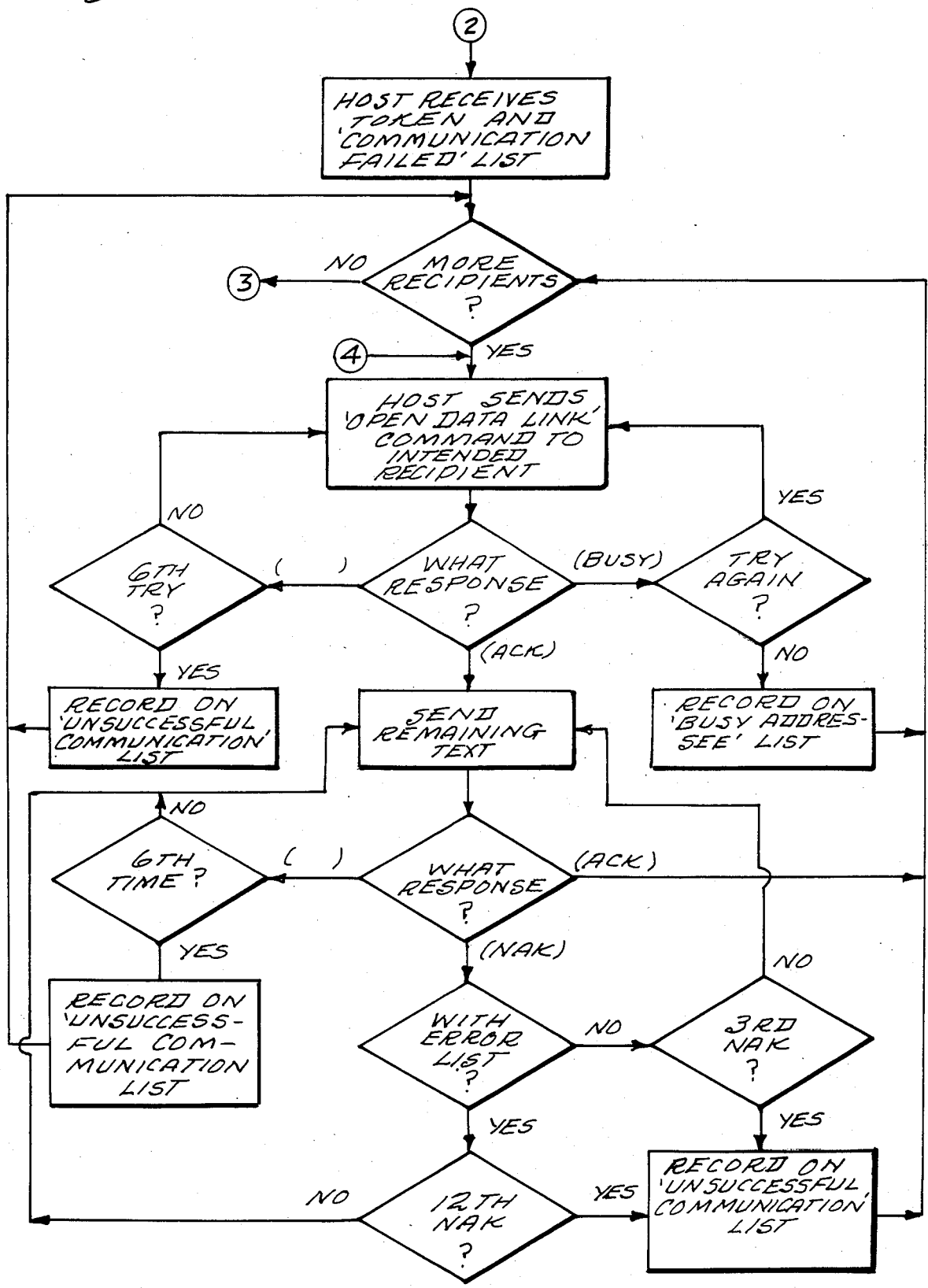
FIGS. 4 and 5 are flowcharts showing operation of a host unit as a sender.
Figure 5:
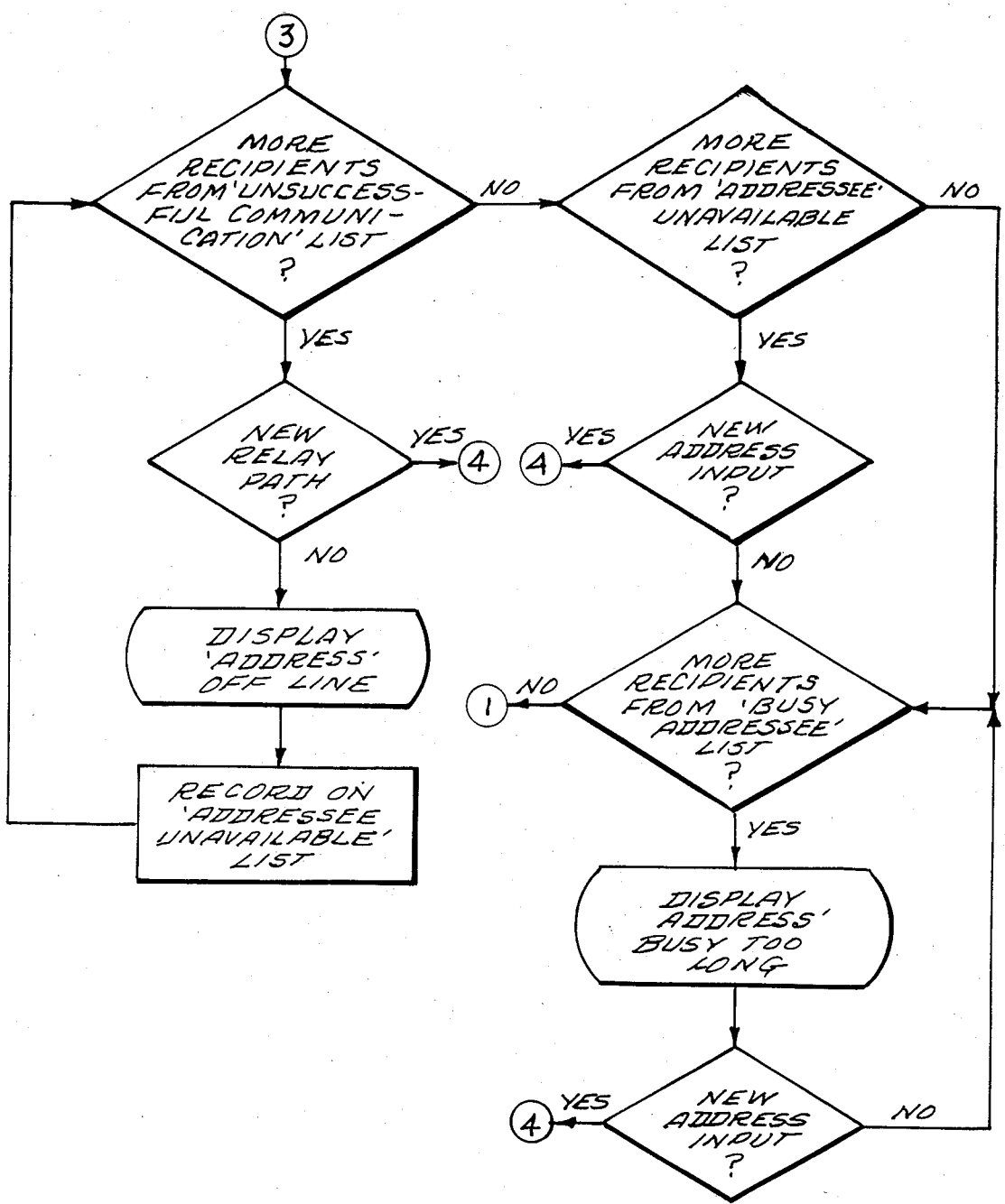

The host unit maintains a table of relay paths to all units in the system. If the host unit receives a message via the host unit Relay command it re-sends the message to the recipient unit, after opening the data link, using the Relay command if necessary. Referring particularly to FIGS. 4 and 5, this message sending by the host unit is shown in flowchart form. It is similar in many regards to the procedure for a terminal unit illustrated by the flowchart of FIG. 3. When the host unit is attempting to establish an open data link, since this is a last chance effort, six tries are allowed if no response is received. Failures for a lack of any response are recorded on an "Unsuccessful Communication" list. Two tries are allowed if a busy signal is received. Failures to establish an open data link because the unit is busy are recorded on a "Busy Address" list.

For those units for which an open data link is established, the text is sent. Again six attempts are made if there are no responses, with failures recorded on the "Unsuccessful Communication" list. If NAK is received with an error list, twelve attempts are made, or if received without an error list, three attempts are made before it is recorded on the list of unsuccessful communications.

As shown particularly in FIG. 5, for those intended recipients to which communication has been unsuccessful, a new relay path is attempted. If it is established, the host returns to the procedure shown in FIG. 4 at point "4" to again attempt to open a data link with it. However, if no new relay path is established, a message is output on the display of the original sending unit stating that that particular recipient is now off-line. It is then recorded on a list of unavailable addressees.

After communication with all intended recipients on the "Unsuccessful Communication" list has been attempted, an inquiry is made to the original sending station, or other designated terminal unit, requesting new addressees for the message. If a new address is inserted, communication is again attempted as described previously. If no new address is input attempts are dropped and the system determines whether there are any intended recipients in the "Busy Addressee" list. If so, they are shown as being busy on the original sending unit display. The sending unit is asked to input a new address of a different recipient unit as an alternative. The message is sent to any alternative recipient units. Otherwise, no more attempts are made and the system begins looking for the next unit having a message to send.

Establishing Relay Paths

Communication with any new unit requesting the token is initially accomplished using the relay path that was used to issue the Token Offer command to which it is responding. For example, if unit ID3 broadcasts the Token Offer command after being accessed from the host unit via the path ID1-ID2-ID3, and unit ID4 responds, communication with unit ID4 is initially implemented via the path ID1-ID2-ID3-ID4.

As a salient feature of the present invention, means are provided for determining a communication route between two units. This includes means for initially directing a message between the units and, if communication is not established directly between them, means are provided for redirecting the message through repeater units individually. If communication is still not established, means are provided for repeatedly directing the message through routes of combinations of repeater units through which communication is established concatenated with individual repeater units not previously communicated with. The following example illustrates how these means operate.

After a newly discovered unit has transmitted its message and returned the token to the host unit and no other units have messages to send, the host unit attempts to find the shortest relay path to that unit. Referring again to FIG. 1, let's assume that terminal unit K is new and has been discovered by host unit H. Unit K is first polled by the host unit directly. Since, in this case, this does not raise a response, unit K is polled via all the units directly accessible by host unit H. Let's assume that the host unit is able to make direct contact with only terminal units D,E,F and J. Host unit H, not being able to communicate directly with unit K, will attempt to contact it through each of the four units with which it can make direct contact. Thus, it attempts to communicate through unit D to unit K. In the example shown, this attempt is unsuccessful. In fact, unit K cannot be contacted through any of them individually.

Increasingly longer communication routes or relay paths are then tested in order to determine which one will provide communication with unit K. Host unit H next attempts, sequentially, to communicate with unit K by forming communication routes having two relays consisting of each of units D,E,F and J concatenated with each of units A,B,C,G,I,L,M and N. Communication paths established at this point are H-D-(A or B or C) and H-J-(G or I or N). It is assumed that no contact has yet been established with units K,L or M. Since unit K is the one with which communication is being attempted, host H next uses the communication routes just defined, trying each one sequentially, and adding to each previously established route, alternately, units L or M, since they have not yet been contacted. Since contact has been established to all other units but there has been no contact with unit K through any of them, it would be useless to try them again.

When unit L is concatenated with relay units J and N, communication with unit K is finally established. The full communication path thus determined, including end units, is H-J-N-L-K. It will be observed that this is the shortest relay path possible between host H and terminal unit K which will provide communication in this circumstance. It may be that unit M could be used in place of unit L but the resulting route would not be any shorter. The system simply accepts the first successful route it finds.

If each terminal unit is provided with the capability of determining relay paths from itself to any other unit, then the same procedure is followed as that just described by replacing host unit H with the sending terminal unit. In such a case, it would not be necessary to send messages through the host unit except as a repeater unit.

It will also be observed that, as mentioned previously, if a unit ceases to communicate with, in this case, the host unit, due, perhaps to changing loading conditions or rearrangement of terminal units on the network, the system will automatically attempt to reroute around any broken communication links. Thus, when an attempted communication using a Poll command fails, the above procedure is followed in order to reestablish the shortest relay path to that unit, if it is still on the network.

It will be appreciated that a system made according to the present invention is a dynamic system which automatically accommodates rearranging of terminal units on a power line network without requiring reprogramming or redesigning the system by the user. Further, by having each terminal unit also function as a repeater unit, the system is capable of providing communication between units which are otherwise incapable of directly communicating without having to dedicate specific repeater units to the network. Accordingly, it is not necessary to go through the expense and effort of determining the design and characteristics of the power line network and system to determine the location of repeater units.

From the above, it can be seen that the communication system of the invention has several features which represent improvements over the prior art. Although this system has been described in connection with a preferred embodiment thereof, it will be appreciated that various modifications and changes can be made therein without departing from the spirit and scope of the invention as defined in the following claims. It is therefore intended that the coverage afforded applicant be limited only by the claims and their equivalent language.

What is claimed is:

1. A system for communicating on a single bus formed by a power distribution network, said system comprising a plurality of units joinable to the network, including at least three terminal units, each terminal unit being connectable directly with at least one external communication device, such as an input or output device, and having when connectable to an input device, means responsive to a message received therefrom for generating a message to be received by another terminal unit, and when connectable to an output device, means responsive to a message received from another terminal unit for transmitting the message to the output device, at least a first one of said terminal units further comprising:
   means for receiving on the network a message transmitted from a second terminal unit;
   means for determining whether the message is intended for a third terminal unit; and
   means for retransmitting on the network such a message intended for a third terminal unit.

2. The communication system of claim 1 which further includes means for establishing the capability of communication between two units prior to transmitting a message from one of the units to the other.

3. The communication system of claim 2 wherein said establishing means includes means within each terminal unit for inquiring of a different terminal unit to which a message is to be sent whether that different terminal unit is ready to receive a message, and means for transmitting a response to the inquiring terminal unit indicating whether it is ready to receive a message.

4. The communication system of claim 1 wherein the units are individually addressable and each terminal unit further includes means for storing a sequential list of addresses of units forming a communication route from that terminal unit to another unit.

5. The communication system of claim 4 wherein said means for generating further includes means for generating a message having a sequential listing of addresses of units forming the corresponding communication route.

6. The communication system of claim 5 wherein said means for retransmitting further includes means for modifying the sequential listing of a received message in a form identifying a next intended unit for retransmitting the message.

7. The communication system of claim 6 wherein said means for retransmitting further includes means for listing in a retransmitted message the address of said first terminal unit with a sequential listing of addresses of units which previously retransmitted the message said first terminal unit is retransmitting.

8. The communication system of claim 1 which further includes means for limiting transmission of messages to transmission by a single terminal unit at a time.

9. The communication system of claim 8 wherein said limiting means includes means for inquiring of said terminal units whether there is a message to transmit to another terminal unit, and further includes, in each terminal unit, means for transmitting, when it has a message to transmit, a response to such an inquiry indicating that it has a message to transmit to another terminal unit.

10. The communication system of claim 9 wherein said limiting means further includes means for transmitting to a terminal unit, in response to the response of the terminal unit that it has such a message to transmit, a message authorizing it to transmit a message to another unit.

11. The communication system of claim 10 wherein said limiting means further includes, in each of said terminal units, means for transmitting a message releasing its authority to transmit messages after it has completed transmission of its message to another terminal unit.

12. In a system having a plurality of units and a single bus formed by a power distribution network joining the units, the units including at least a pair of terminal units each terminal unit being connectable to at least one external communication device, such as an input or output device, and having, when connectable to an input device, means for generating a message received from the input device to another terminal unit, and, when connectable to an output device, means for transmitting a message received from another terminal unit to the output device, a repeating terminal unit connectable to at least one input/output device and comprising:
   means connectable with the network for transmitting a message received from an input device to another terminal unit when said repeating terminal is connectable to an input device;
   means connectable with the network for receiving a message transmitted by another unit;
   means responsive to the received message for determining whether the message is intended for yet another terminal unit;
   means connectable with the network for retransmitting on the network such a received message intended for another terminal unit; and
   means for transmitting a received message intended for said repeating terminal unit to an output device, when said repeating terminal is connectable to an output device.

13. The repeating terminal unit of claim 12 which is individually addressable and the units in the system are also individually addressable, said repeating terminal unit further including means for storing a sequential list of addresses of units forming a communication route from said repeating terminal unit to another unit.

14. The repeating terminal unit of claim 13 wherein the units of the communication system include a plurality of repeater units having means for receiving messages on the network and retransmitting the received signal on the network, and wherein a message transmitted by a terminal unit includes a sequential listing of the address for each unit forming the corresponding communication route, said means for retransmitting further including means for modifying the sequential listing in a form identifying a next intended repeater unit on the communication route.

15. The repeating terminal unit of claim 14 wherein said means for retransmitting further includes means for sequentially listing in a retransmitted message the address of said repeating terminal unit in a listing of addresses of units which have transmitted the message said repeating terminal unit is retransmitting.

16. A system for communicating on a single bus formed by a power distribution network, said system comprising a plurality of units joined to the network, including at least a pair of terminal units, each terminal unit being connected to and having means for communicating with an external communication device, such as an input or device, and having means for communicating on the network with the other terminal unit, and at least one repeater unit having means for receiving and means for retransmitting messages on the network, at least one of said units further comprising means for determining a communication route between said one unit and a terminal unit, including means for initially directing a message directly to said terminal unit and means for redirecting a message to said terminal unit through each repeater unit individually, when communication is not established directly with said terminal unit.

17. The communication system of claim 16 which further includes a plurality of repeater units and said means for determining a communication route further includes means for repeatedly directing a message to the other terminal unit, when communication with the other terminal unit has not been previously established directly or through an individual repeater unit, through routes of repeater units through which communication has been established concatenated with individual repeater units with which communication has not otherwise been established, until communication with the other terminal unit is established.

18. The communication system of claim 16 wherein said repeater unit is also a terminal unit.

19. The communication system of claim 18 wherein at least one terminal unit includes said means for determining a communication route.

20. The commmunication system of claim 18 wherein at least one terminal unit is also a repeater unit, is individually addressable, and includes means for storing a sequential list of the addresses of units forming a communication route from that unit to another unit.

21. The communication system of claim 20 wherein each unit includes means for generating a message intended for a recipient terminal unit containing a sequential listing of addresses for the units forming a communication route to the intended recipient unit.

22. The communication system of claim 21 wherein each of said terminal units further includes means for determining whether a received message is intended for another unit.

23. The communication system of claim 22 wherein each of said combination terminal and repeater units also includes means for modifying a received message for which it is an intended repeater for retransmission in a form identifying a next repeater unit on the communication route.

24. A system for communicating on a power distribution network, said system comprising a plurality of addressable units joined to the network, including at least a pair of terminal units, each terminal unit being connected to, and having means for communicating with, an external communication device, such as an input or output device, and having means for communicating on the network with the other terminal unit, and at least one repeater unit having means for receiving and means for retransmitting messages on the network, said system further comprising means for storing as a communication route the addresses of each unit used for communicating between two of the units, means for establishing the capability of communication between two intended communicating units along a previously stored communication route prior to transmitting a message from one of the communicating units to the other, and means for automatically determining a communication route between the communicating units when communication is not established along a previously stored communication route by said means for establishing.

25. A method of determining a communication route between one terminal unit and another terminal unit in a communication system having a plurality of terminal units and a plurality of repeater units joined by a power distribution network, which units are individually addressable, said method comprising:
directing a message from the one terminal unit directly to the other terminal unit;
then directing a message from the one terminal unit to the other terminal unit through successively increasing numbers of identified repeater units, when communication is not previously established with the other terminal unit, until the other terminal unit receives the message; and thereafter
storing the addresses of the units forming the communication route between the one and the other terminal units.

26. The method of claim 25 wherein said directing a message through repeater units includes initially directing a message through each repeater unit individually, thereby establishing a repeater route for each repeater unit with which communication is established from the one terminal unit, and then repeatedly directing a message to the other terminal unit through repeater routes formed of previously established repeater routes concatenated with a repeater unit with which communication has not otherwise been established, when communication with the other terminal unit is previously not established.

27. A method for communicating on a power distribution network between a plurality of individually addressable terminal units with each terminal unit being connected directly with at least one external communication device comprising, sequentially:
receiving at a first terminal unit a message received from an external device, transmitting the message on the network for receipt by an intended recipient terminal unit;
receiving by a second terminal unit on the network the transmitted message;
determining whether the message is intended for a third terminal unit;
retransmitting on the network a message intended for a third terminal unit; and
transmitting the received message intended for the second terminal unit to an external device.

28. The method of claim 27 which further includes, prior to said transmitting on the network, establishing the capability of communication with the intended recipient unit for each message to be transmitted.

29. The method of claim 28 wherein said establishing further includes inquiring of the intended recipient terminal unit whether that unit is ready to receive a message, and transmitting, by the intended recipient unit, an appropriate response to the inquiring terminal unit indicating whether it is ready to receive a message.

30. The method of claim 27 wherein transmitting on the network further includes transmitting a message having a sequential listing of addresses of units forming a communication route from the first terminal unit to the intended recipient terminal unit.

31. The method of claim 30 wherein said retransmitting on the network further includes modifying the sequential listing of a received message in a form identifying a next unit intended to receive and retransmit the message.

32. The method of claim 31 wherein said retransmitting on the network also further includes listing in a retransmitted message the address of the terminal unit retransmitting the message with a sequential listing of addresses of units which previously retransmitted the message.

33. The method of claim 27 which further includes, prior to said transmitting on the network, limiting transmission of messages on the network to transmission by a single terminal unit at a time.

34. The method of claim 33 wherein said limiting further includes inquiring of the terminal units whether there is a message to transmit to another terminal unit, and transmitting by each terminal unit having a message to send a response indicating that it has a message to send.

35. The method of claim 34 wherein said limiting also further includes transmitting to a terminal unit which responded that it has a message to transmit a message authorizing it to transmit a message to another unit.

36. The method of claim 35 wherein said limiting yet further includes transmitting, by each terminal unit having received a message authorizing it to transmit a message to another unit, a message releasing its authority to transmit messages after it has completed transmission of its message to another terminal unit.

37. A method for sending a second message on a power distribution network from a transmitting unit to an intended receiving unit via at least one other unit, all of which units are addressable, comprising, in sequence:

determining a route from the transmitting unit to the receiving unit via a communication route formed of an ordered sequence of at least one individually addressable intermediate unit each of which functions as a repeater unit;

establishing the capability of communication between the transmitting unit and receiving unit along the previously determined communication route by sending a first message to the receiving unit;

transmitting the second message from the transmitting unit to the receiving unit over the communication route when the capability of such communication is established;

determining a new communication route between the transmitting and receiving units when communication is not established along the previously determined communication route; and transmitting the second message from the transmitting unit to the receiving unit over the new communication route.

* * * * *